United States Patent
McGrane et al.

(10) Patent No.: US 7,793,126 B2
(45) Date of Patent: Sep. 7, 2010

(54) USING PRIORITIES AND POWER USAGE TO ALLOCATE POWER BUDGET

(75) Inventors: Sean Nicholas McGrane, Sammamish, WA (US); John M. Parchem, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 11/655,427

(22) Filed: Jan. 19, 2007

(65) Prior Publication Data

US 2008/0178019 A1      Jul. 24, 2008

(51) Int. Cl.
G06F 1/26        (2006.01)
(52) U.S. Cl. .................... 713/320; 713/300; 713/323
(58) Field of Classification Search .................. 713/300
See application file for complete search history.

(56) References Cited

U.S. PATENT DOCUMENTS

| | | | |
|---|---|---|---|
| 6,904,534 B2 | 6/2005 | Koenen | |
| 6,986,069 B2 | 1/2006 | Oehler et al. | |
| 7,043,647 B2 | 5/2006 | Hansen et al. | |
| 7,043,650 B2 * | 5/2006 | Bresniker et al. | 713/324 |
| 7,051,215 B2 | 5/2006 | Zimmer et al. | |
| 7,155,622 B2 * | 12/2006 | Mancey et al. | 713/324 |
| 7,581,125 B2 * | 8/2009 | Ranganathan et al. | 713/320 |
| 7,647,516 B2 * | 1/2010 | Ranganathan et al. | 713/320 |
| 2002/0007463 A1 | 1/2002 | Fung | |
| 2003/0023885 A1 | 1/2003 | Potter et al. | |
| 2003/0055969 A1 | 3/2003 | Begun et al. | |
| 2003/0056126 A1 | 3/2003 | O'Connor et al. | |
| 2004/0230848 A1 * | 11/2004 | Mayo et al. | 713/320 |
| 2005/0055590 A1 * | 3/2005 | Farkas et al. | 713/320 |
| 2005/0076251 A1 | 4/2005 | Barr et al. | |
| 2005/0272402 A1 * | 12/2005 | Ferentz et al. | 455/402 |
| 2006/0082222 A1 | 4/2006 | Pincu et al. | |
| 2008/0215900 A1 * | 9/2008 | Bahali et al. | 713/300 |
| 2009/0031153 A1 * | 1/2009 | Bahali et al. | 713/310 |

OTHER PUBLICATIONS

"HP Rack Server Solutions", http://www.hp.com/sbso/serverstorage/proliant_business_advantage/hp-rack-server-solutions.pdf.
"Power Management", http://h18000.www1.hp.com/products/servers/proliant-advantage/power-mgmt.html.
Ranganathan, et al.,"Ensemble-level Power Management for Dense Blade Servers", Date: 2006,http://delivery.acm.org/10.1145/1140000/1136492/26080066.pdf?key1=1136492&key2=1085053611&coll=GUIDE&dl=GUIDE&CFID=6099685&CFTOKEN=88888034.

* cited by examiner

*Primary Examiner*—Nitin C Patel

(57) ABSTRACT

Aspects of the subject matter described herein relate to using priorities and power usage to allocate power budget to devices. In aspects, a console that maintains power usage, priorities, and other power data regarding a set of devices may receive a notification that a device has exceeded its budgeted power. In response, using priorities and power usage associated with the devices, the console determines one or more devices to instruct to use less power. A device that exceeded its budgeted power may be instructed to operate at a lower power level or another device (e.g., a lower priority device that is underutilizing its budgeted power) may be instructed to reduce its power to remain below a power budget for the set of devices.

20 Claims, 9 Drawing Sheets

FIG. 3

Power Capabilities Data Structure ~300

| Server ID 305 | Power Profile 310 | Power Level 315 |
|---|---|---|
| Server1 | PP1 | 700W |
| Server1 | PP2 | 600W |
| Server1 | PP3 | 500W |
| Server1 | PP4 | 400W |
| Server1 | PP5 | 300W |
| ... | ... | ... |
| ServerN | PP1 | 450W |

Power Budget Data Structure ~320

| GroupID | Power Budget |
|---|---|
| Rack1 | 10 KW |
| Rack2 | 7 KW |
| Assorted_Servers | 3 KW |
| Network_Devices | 1 KW |
| Blade_Server1 | 10KW |
| ... | ... |
| GroupN | 5KW |

FIG. 4

Priorities Data Structure (400)

| Workload ID 405 | Priority 410 |
|---|---|
| Workload1 | 10 |
| Workload2 | 20 |
| Workload3 | 30 |
| Workload4 | 40 |
| Workload5 | 20 |
| ... | ... |
| WorkloadN | 30 |

Priorities Data Structure (420)

| Device ID 425 | Priority 410 |
|---|---|
| Device1 | 10 |
| Device2 | 20 |
| Device3 | 30 |
| Device4 | 40 |
| Device5 | 20 |
| ... | ... |
| DeviceN | 30 |

Priorities/Profile Association (430)

| Priority | Power Profile |
|---|---|
| 10 | PP1 |
| 20 | PP1 |
| 30 | PP2 |
| 40 | PP4 |
| ... | |
| N | PPN |

FIG. 5

| Power Metadata |||||| 
|---|---|---|---|---|---|
| Group ID 505 | Server ID 510 | Priority 515 | Current Power Profile 520 | Power Budget 525 | Other Data 530 |
| Rack10 | Server1 | 10 | PP1 | 700W | Data1 |
| Rack10 | Server2 | 10 | PP2 | 700W | Data2 |
| Rack10 | Server3 | 20 | PP3 | 500W | Data3 |
| Rack10 | Server4 | 30 | PP4 | 400W | Data4 |
| Rack10 | Server5 | 40 | PP5 | 300W | Data5 |
| ... | ... | ... | ... | ... | ... |
| RackN | ServerN | 10 | PP1 | 750W | DataN |

902
A DEVICE IN RACK5 HAS EXCEEDED ITS ALLOTTED POWER BUDGET
POWER HAS BEEN REALLOCATED AMONG THE FOLLOWING DEVICES:

DEVICE #1 INFORMATION
  NAME:             SERVER1   905
  PRIORITY:         MISSION CRITICAL (10)   910
  OLD POWER BUDGET: 700 WATTS   915
  NEW POWER BUDGET: 800 WATTS   920

DEVICE #2 INFORMATION
  NAME:             SERVER5   925
  PRIORITY:         LOW (50)   930
  OLD POWER BUDGET: 400 WATTS   935
  NEW POWER BUDGET: 300 WATTS   940

205

USING PRIORITIES AND POWER USAGE TO ALLOCATE POWER BUDGET

BACKGROUND

A data center may include racks of servers, networking equipment, and other electronic devices. To determine how many devices a data center may handle, a power rating value of the power supply unit of each device may be used. This value is referred to as 'label power' and is typically much higher than the maximum power the particular device could ever draw. Using the 'label power' results in budgeting too much power for each device, and, as a result, servers may be populated more sparsely than they need to be. Data center floor space is very expensive and this under-utilization has a negative effect on the total cost of ownership for the data center.

SUMMARY

Briefly, aspects of the subject matter described herein relate to using priorities and power usage to allocate power budget to devices. In aspects, a console that maintains power usage, priorities, and other power data regarding a set of devices may receive a notification that a device has exceeded its budgeted power. In response, using priorities and power usage associated with the devices, the console determines one or more devices to instruct to use less power. A device that exceeded its budgeted power may be instructed to operate at a lower power level or another device (e.g., a lower priority device that is underutilizing its budgeted power) may be instructed to reduce its power to remain below a power budget for the set of devices.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 3 illustrates exemplary power data structures that may be used in accordance with aspects of the subject matter described herein;

FIG. 4 illustrates exemplary priorities data structures that may be used in accordance with aspects of the subject matter described herein; and FIG. 5 illustrates exemplary metadata that a console may store regarding the power state of servers in accordance with aspects of the subject matter described herein;

FIG. 9 is a block diagram that illustrates an exemplary user interface that may notify a system administrator of a reallocation of power budget in accordance with aspects of the subject matter described herein.

DETAILED DESCRIPTION

Exemplary Operating Environment

Figure 1:
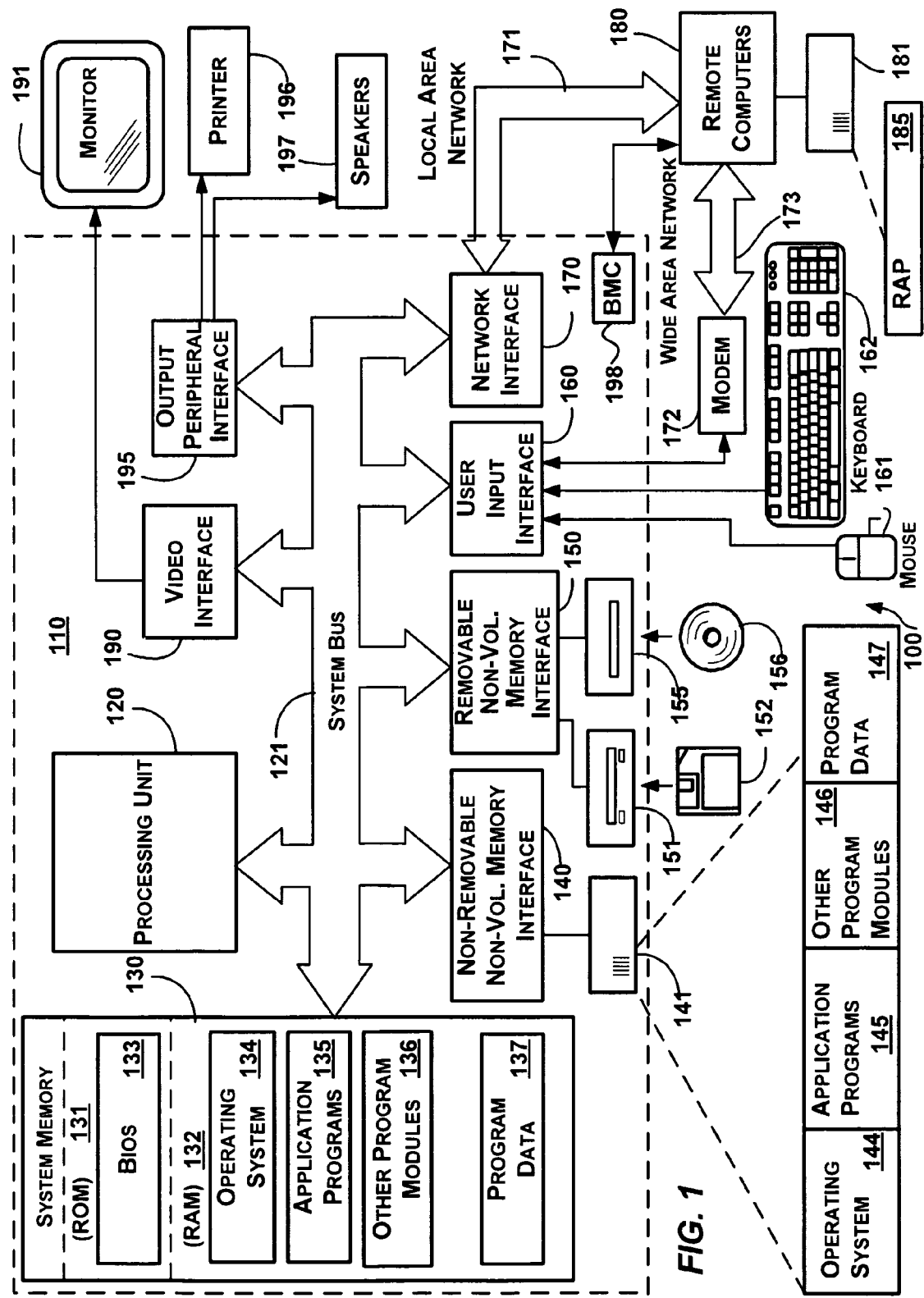
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, L and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium other than communication media which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A baseboard management controller (e.g., BMC 198) may be embedded on the computer 110 to allow the computer 110 to communicate with other devices out-of-band (e.g., without using an operating system). The BMC 198 may be able to report temperature, cooling fan speeds, power mode, operating system status, and the like to a console (such as console 205 of FIG. 2). The BMC 198 may include a processor that is capable of operating at a very low power draw when other components of the computer 110 are turned off. In addition, the BMC 198 may communicate what power capabilities the computer 110 has and may be able to set the power level of the computer 110. Power capabilities include the different power level(s) at which the computer 110 is able to operate.

Power Budgeting

Figure 2:
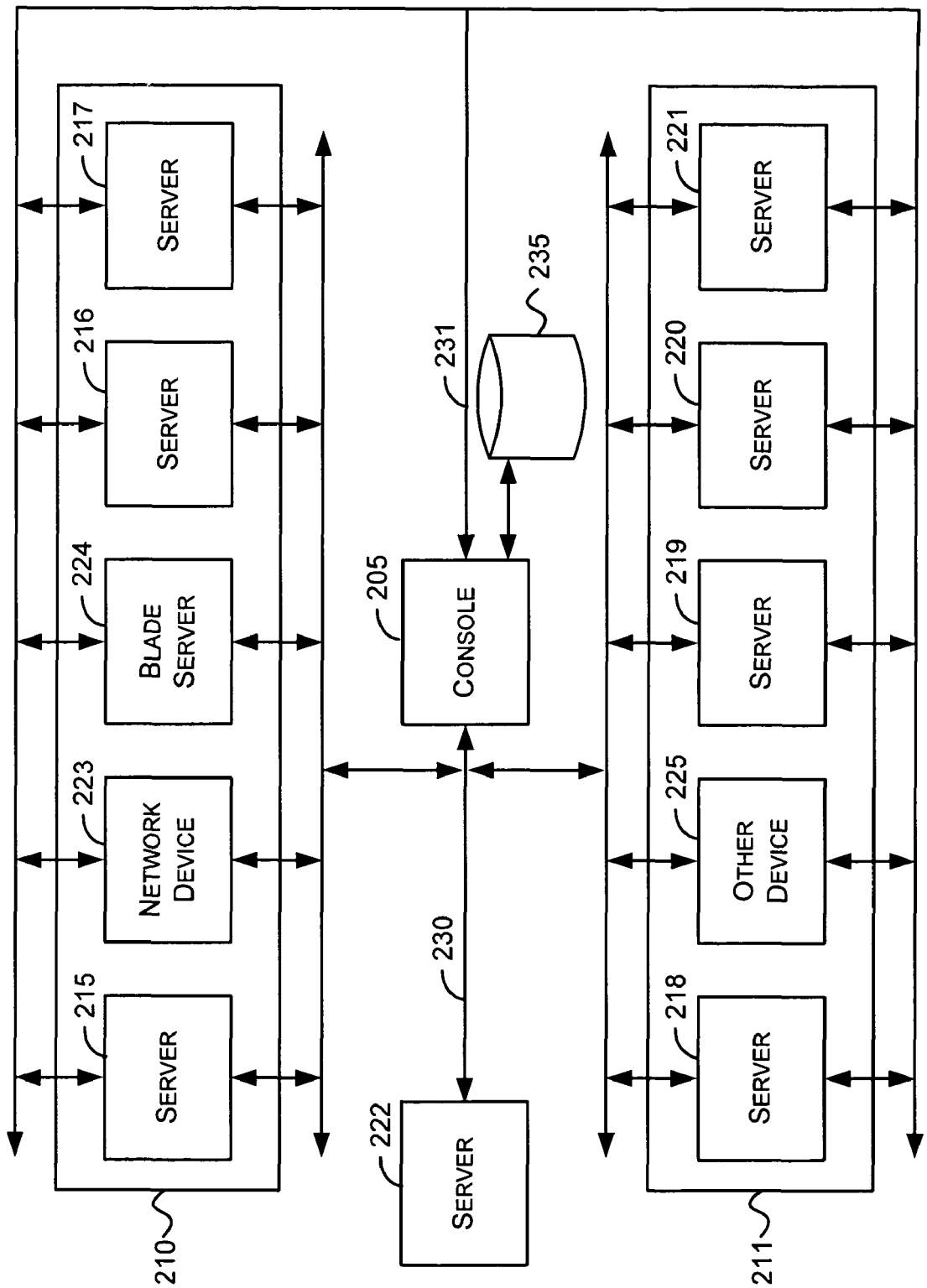
FIG. 2 is a block diagram of an exemplary system in which aspects of the subject matter described herein may operate.

A data center may include many servers and other electronic devices as shown in FIG. 2. The data center needs to be able to supply enough power to the devices and also needs to be able to have enough cooling capacity to keep the devices at a safe operating temperature. Many of the devices in a data center may be mounted in racks while other of the devices may be free-standing. Each rack may be assigned a particular power budget. For correct operation, the combined power consumed by the devices in a rack should not exceed its assigned power budget. Doing so may cause a breaker to trip or may cause too much heat which may adversely affect other components in the rack or in other racks.

Devices may be allotted power according to priorities assigned to the devices. For example, higher priority devices may be allowed to operate at higher power levels while lower power devices may be instructed to operate at lower power levels. Although instructed to consume no more than a certain amount of power, a device may exceed this power. If the device exceeds its allotted power, the device may communicate this to a central console which then determines how to allot power to various devices so as to remain within a power budget assigned to the devices.

FIG. 2 is a block diagram of an exemplary system in which aspects of the subject matter described herein may operate. The system includes a console 205 (e.g., a central management console), racks 210-211, devices 215-225, and communication channels 230-231.

The devices 215-225 may include servers (e.g., servers 215-222), network devices (e.g., network device 223), blade servers (e.g., blade server 225), and other devices (e.g., other device 225). The rack 210 houses the servers 215-217, the network device 223, and the blade server 225 while the rack 211 houses the servers 218-221 and the other device 225. The server 222 may be free-standing and may be located outside of a rack. An exemplary device that may be used as a server such as one of servers 215-222 is the computer 110 of FIG. 1 configured with appropriate hardware and software. A data center may have more or fewer devices and racks like the ones represented in FIG. 2.

The communication channel 230 may include one or more networks that connect the devices 215-225 to the console 205 and to other devices and or networks such as the Internet (not shown). A suitable networking protocol such as the TCP/IP protocol, token ring protocol, or some other network protocol may be used to communicate via the communication channel 230.

The communication channel 231 may comprise a network, point-to-point links (e.g., serial connections), or other communication link that allows communication with the devices 215-225 "out-of-band." Out-of-band in this sense refers to being able to communicate with the devices without regard to the operating system on the devices 215-225.

In one embodiment, a baseboard management controller (BMC) may be embedded on a device to allow the console 205 to communicate with the device out-of-band. An exemplary BMC (e.g., BMC 198) is described in conjunction with FIG. 1. As described previously, the BMC may be able to report temperature, cooling fan speeds, power mode, operating system status, and the like to the console 205. In addition, the BMC may communicate what power capabilities its corresponding device has. Power capabilities include the different power level(s) at which a device is able to operate.

The console 205 may store these power capabilities and priority data in one or more data structures located on a storage device 235. The storage device 235 may comprise computer-readable media such as the computer-readable media described in conjunction with FIG. 1, for example. Some exemplary formats of these data structures are described in more detail in conjunction with FIGS. 3 and 4. In general, the one or more data structures (hereinafter sometimes referred to simply as "the data structure") includes the various power level(s) at which each device is capable of operating and includes a way of identifying the device associated with each power level. In addition, the data structure may associate a location (e.g., rack) with each device. The data structure may also include a power budget that is associated with a set of devices. These set of devices may be physically collocated (e.g., in a single rack), or may be spread throughout a data center. The data structure may also associate workloads with priorities and priorities with power profiles.

In one embodiment, the data structure does not include information regarding how the devices are able to implement a power level. For example, the data structure may not include what components a device powers on or off or places in an increased or reduced power state to achieve a power level. Instead, the data structure may simply include the power levels at which the device is capable of operating. In other words, the details of which components are running in which power modes on a particular server may be transparent to a console using the data structure.

In this embodiment, omitting power information about components of each device provides flexibility to describe new power levels that may be introduced in the future. For example, a data structure that was structured to obtain power information about a pre-determined set of hardware may not work properly if new hardware is developed. In addition, having the device determine which components to place in a different power state based on a console commanded power level allows device manufacturers to cause their devices to operate within certain tested configurations.

Using the data structure, the power management software on the console 205 (or on any other machine capable of accessing the storage device 235) may accurately determine how much power is needed by a set of devices and how much power from a budget is remaining for a set of devices. Where location information is included, the power management software may determine whether additional devices may be added to a set of devices (e.g., on a rack) and still consume less power than the power budget allocated to the set of devices.

A device may be instructed to operate at a supported power level by sending a command to the device to operate at the power level. In one embodiment, if the device is under control of an operating system, this may be done through the communication channel 230 by communicating with the operating system (or software executing thereon). In another embodiment, this may be done out-of-band via the communication channel 231 regardless of whether the device is under control of an operating system. When the device receives the command, it determines which components to power on or off or to reduce or increase in power consumption to not exceed the power level specified by the command. For example, when operating above its minimum power consumption, a CPU may be instructed to decrease its power consumption.

In conjunction with being instructed to operate at a supported power level, a device may also be instructed to notify the console 205 if the device exceeds the power level. In response, the console 205 may take various actions to ensure that the power consumed by a set of affected devices does not exceed the power budgeted to those devices as described in more detail below.

FIG. 3 illustrates exemplary power data structures that may be used in accordance with aspects of the subject matter described herein. The power capabilities data structure 300 includes a server ID field 305, a power profile field 310, and a power level field 315. The power level field 315 indicates a maximum power that the device may consume when assigned to its associated power profile. The server ID field 305 includes entries that associate the power levels with devices. These entries may include unique identifiers that identify the devices.

In one embodiment, data may be stored that indicates the power profile that is active on each of the devices. This data may then be used for budgeting power or otherwise without re-querying the devices to obtain the power profiles.

In one embodiment, the power profile field 310 may be omitted from the power capabilities data structure 300. In this embodiment, a device may be instructed to operate at a power no greater than a particular power level by sending the power level to the device.

In one embodiment, having a device "operate at" a particular power level does not mean that the device is required to use the power of the particular power level. Rather, it means that the device may use any power that does not exceed the particular power level. For example, if the work a device is doing is reduced, the device may determine to draw less power until more work is given to the device.

The power capabilities data structure 300 includes an entry for each power level of each device for which power budgeting is desired. In another embodiment, another field may be added to the power capabilities data structure 300 that includes a location (e.g., rack number, physical location as indicated, for example, by coordinates, etc.) or grouping of devices that are affected by a common power budget. This field may be used in conjunction with a power budget data structure 320 to allocate power to each device in the group.

FIG. 4 illustrates exemplary priorities data structures that may be used in accordance with aspects of the subject matter described herein. In one embodiment, the priorities data structure 400 may include one or more items (e.g., rows) that each include a workload ID field 405 and a priority field 410.

A value in the workload ID field 405 serves to identify a workload that is associated with the priority included in the priority field 410. In one embodiment, a workload corresponds to the processes that execute on a single server. In one embodiment, the single server is a physical server. In another embodiment, the single server is a virtual server. In virtual server embodiments, a workload may correspond to all the processes that execute in the virtual server environment for a single virtual server or the workload may correspond to all the processes that execute on a physical machine (which may include more than one virtual server). In embodiments where a physical machine hosts multiple virtual servers and each virtual server is assigned a priority or where a physical machine is assigned several workloads that are each assigned a priority, the priorities may be combined in some fashion to generate a priority that applies to the physical machine.

If a workload is migrated from one machine to another, the workload ID may still be used to identify the workload and associate a priority with it.

In another embodiment, a workload ID corresponds to or may be replaced with a physical device ID as illustrated in the priority data structure 420. The priority data structure 420 includes items (e.g., rows) that each include a device ID field 425 and a priority field. In this embodiment, high priority workloads may be assigned to devices with high priorities or the device to which a high priority workload is assigned may be assigned a high priority. If a workload is moved to another physical device, the priority associated with the other physical device may be changed to correspond to the priority of the moving workload.

A workload may also be thought of as a server role. For example, a server may be considered an e-mail server, a web server, a database server, a financial server, a file server, a network server, a print server, a directory server, and the like. As such, a server role may be associated with a priority such that each server fulfilling the server role is assigned the priority.

Workloads may be associated with servers in many different ways. For example, when a workload corresponds to all the processes that execute on a single server, the workload ID field 405 may simply include the server ID. As another example, a data structure that explicitly maps workloads to servers may be employed to associate workloads to servers. Other mechanisms may also be used without departing from the spirit or scope of aspects of the subject matter described herein.

A priority may be assigned to a workload through various mechanisms. In one embodiment, a workload may be assigned a priority through input received from a user interface. This may be done during deployment, for example. In another embodiment, a workload may be assigned a priority through a manifest that accompanies that workload. A manifest may include the hardware and software needed for a workload as well as the priority. In yet another embodiment, a workload may be assigned a priority via a script or some automated process.

The priority field 410 includes relative power priorities for the associated workloads or devices. In one embodiment, a priority with a lower number has a higher priority than a priority with a higher number. In another embodiment, this may be reversed.

In one embodiment, a data structure such as the priorities/profile data structure 430 may be used to associate priorities with power profiles. A priority that is not found in the priorities/profile data structure 430 may be associated with a power profile of the priority that is just higher or just lower than the priority. For example, if a workload has a priority of 25, the priority may be associated with the PP1 or the PP2 profile.

FIG. 5 illustrates exemplary metadata that a console may store regarding the power state of servers in accordance with aspects of the subject matter described herein. In one embodiment, the power metadata 500 includes one or more items (e.g., rows or objects) that each include a group ID field 505, a server ID field 510, a priority field 515, and current power profile field 520, a power budget field 525, and one or more other data fields 530.

The group ID field 505 operates similarly to the group ID field described in conjunction with FIG. 3. The server ID field 510 operates similarly to the server ID field 305 as described in conjunction with FIG. 3. The priority field 515 operates similarly to the priority field 410 described in conjunction with FIG. 4.

The current power profile 520 indicates the power profile at which the associated device is operating. The power budget 525 indicates the power allotted from the power budget for the associated device.

The other data 530 may include information about actual power usage of each device. This information may include maximum power consumed, minimum power consumed, average power usage, trend usage, and resource usage (e.g., CPU utilization) for a period of time. The other data 530 may be created and updated by periodically polling or receiving power usage data from the devices (e.g., via BMCs).

The titles of each field and the title of the data structures described herein are optional and need not be stored in the data structures or elsewhere.

As mentioned previously, a device may be instructed to operate at a given power level (e.g., the power level associated with a given power profile) and also instructed to notify the console if the device exceeds the power level. If a device exceeds the power level, the console may then reallocate power budget to a set of affected devices as described in more detail below.

In another embodiment, a device may be instructed to send a notification if it consumes more power than a set percentage of a set power level. The power level corresponding to this percentage is sometimes referred to as a threshold or threshold power. The threshold power may include any percentage of the set power level including 100%. The threshold power may correspond to the power budgeted to the device.

In one embodiment, the console may instruct the device that has exceeded its power level to operate at a lower power level associated with another power profile. The console may continue to budget the same amount of power to the device and may maintain the instruction to notify the console if the old power level is exceeded. For example, if a device was operating at 700 watts in power profile 1, the device may be instructed to operate at 500 watts in power profile 2. In addition, the instruction to notify the console if the device exceeds 700 watts may remain in force. With the lower power level at which the device is instructed to operate, the likelihood of exceeding 700 watts may greatly diminish.

If the device again exceeds its power budget, it may be instructed to operate at an even lower power. This may continue until the device is instructed to operate at its lowest power level at which point if the device again exceeds its power budget, the device may be instructed to power down. A system that works in accordance with the actions outlined above is illustrated in FIG. 6.

Figure 6:
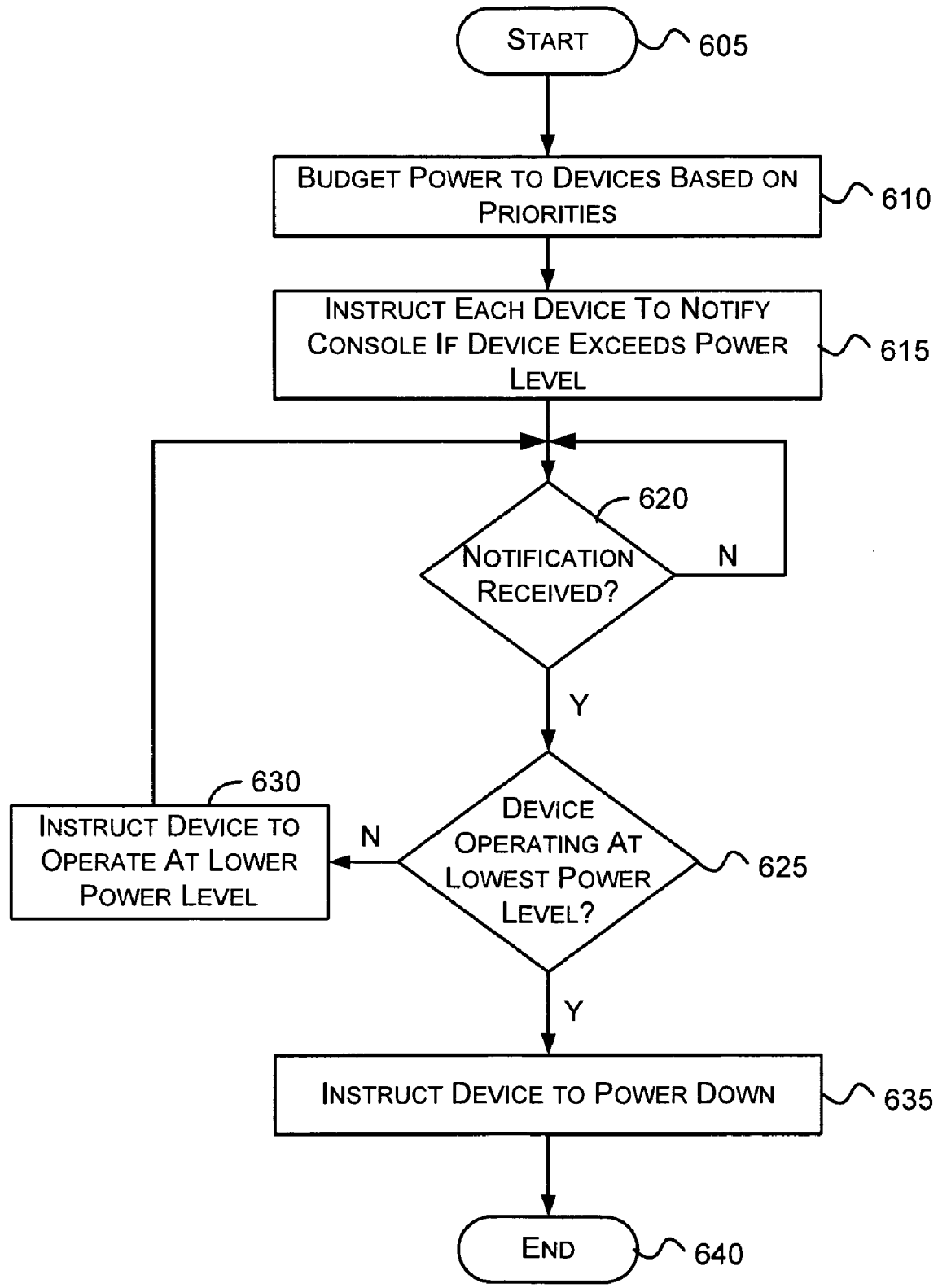
FIG. 6 is a flow diagram that generally represents exemplary actions that may occur in responding to an over-power event in accordance with aspects of the subject matter described herein.

FIG. 6 is a flow diagram that generally represents exemplary actions that may occur in responding to an over-power event in accordance with aspects of the subject matter described herein. An over-power event is an event in which a device exceeds its assigned power budget. At block 605, the actions begin.

At block 610, power of a power budget is budgeted to devices based on the priorities of the devices. For example, referring to FIG. 2, the devices in rack 210 may be budgeted 8 kilowatts. The console 205 may budget this power to the devices of the rack 210 using priority data structures similar to those illustrated in FIG. 4 and the power capabilities data structure 300 illustrated in FIG. 3.

At block 615, each device is instructed to notify the console if it exceeds a power level associated with its budget. As mentioned previously, in conjunction with budgeting power to the devices, the console may also send each device a threshold power value. If a device draws more than this power value or a set threshold power, the device is to notify the console of this event.

At block 620, if a notification of going over the power level or threshold power is received, the actions continue at block 625. At block 625, if the device that sent the notification is operating at it lowest power level, the actions continue at block 635; otherwise, the actions continue at block 630.

At block 630, the device is instructed to operate at a lower power level. The hope is that by instructing the device to operate at an even lower power level that the device will not again exceed its power budget. As mentioned previously, the device does not need to be instructed to notify if it goes over the lower power level. It may continue to notify if it goes over the original power level.

At block 635, the device is instructed to power down. For example, the device may be malfunctioning if it continues to draw more power than its power budget even when operating at its lowest power level.

At block 640, the actions end.

The actions that have been described above in conjunction with FIG. 6 may be sufficient for some applications of power budgeting, but in some scenarios, it may be more important to give an offending device (i.e., a device that exceeds its power budget) even more power budget and to take budgeted power away from another device. For example, the offending device may be a mission critical device whose operation is critical to the success of a business. If the device needs more power to successfully perform its job, the device should be given more power. In this case, it may be better to reduce the power budget of another device as described below.

Figure 7:
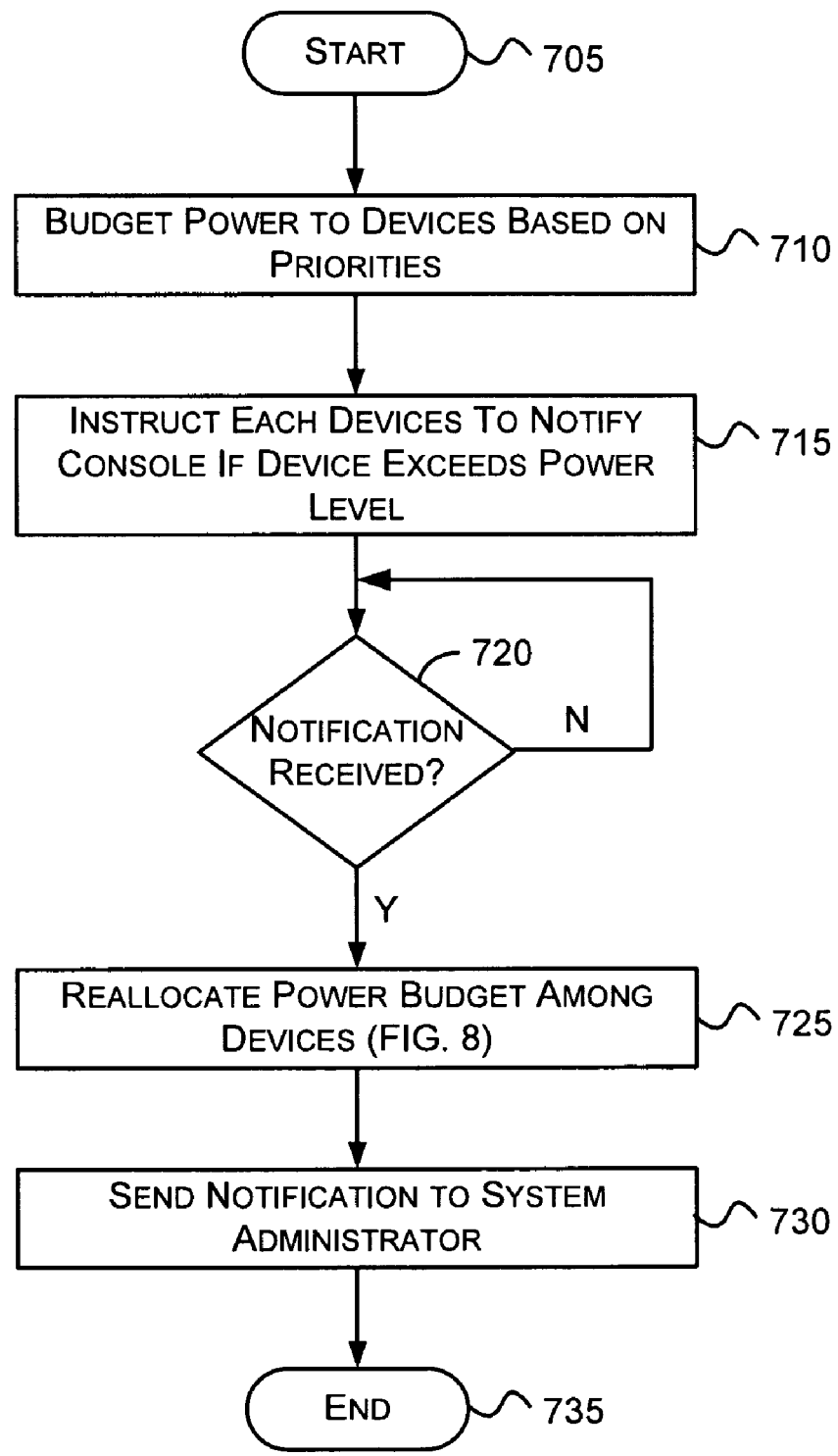
FIG. 7 is a flow diagram that generally represents other exemplary actions that may occur in responding to an over-power event in accordance with aspects of the subject matter described herein.

FIG. 7 is a flow diagram that generally represents other exemplary actions that may occur in responding to an over-power event in accordance with aspects of the subject matter described herein. At block 705, the actions begin.

The actions that occur at blocks 710, 715, and 720 are similar to those that occur at blocks 610, 615, and 620 as described in conjunction with FIG. 6.

Figure 8:
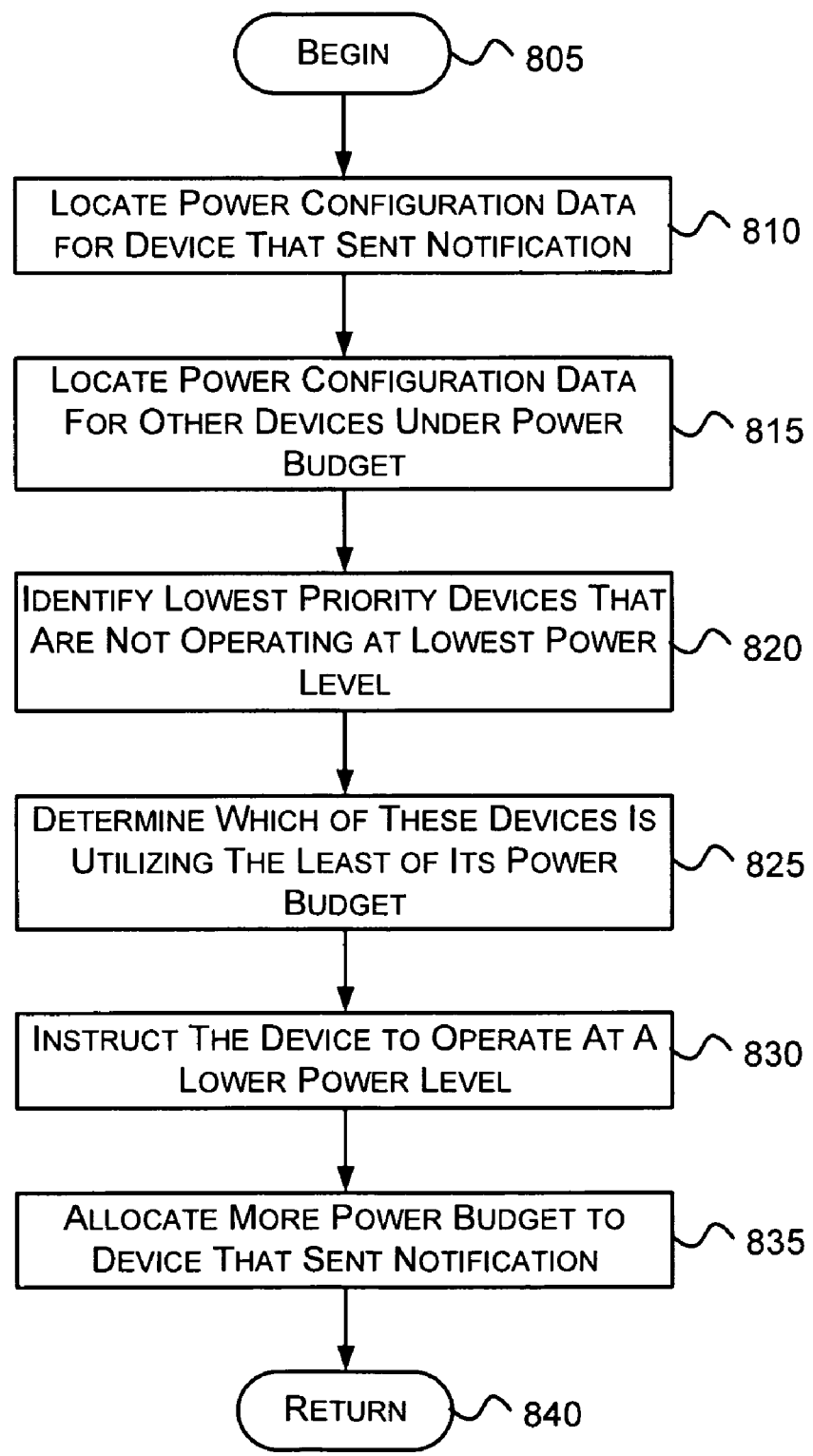
FIG. 8 is a flow diagram that generally represents actions corresponding to block 725 of FIG. 7 that may occur in reallocating power budget among devices in response to an over-power event in accordance with aspects of the subject matter described herein.

At block 725, in response to receiving a notification that a device has exceeded its allotted budget, the power budget allotted to a set of devices that includes the device is reallocated as described in more detail in conjunction with FIG. 8.

At block 730, a notification of the reallocation of power budgets may be sent to a system administrator or the like. At block 735, the actions end.

FIG. 8 is a flow diagram that generally represents actions corresponding to block 725 of FIG. 7 that may occur in reallocating power budget among devices in response to an over-power event in accordance with aspects of the subject matter described herein. At block 805, the actions begin.

At block 810, the power configuration data is located for the device that sent the over-power notification. For example, referring to FIGS. 2 and 5, the console 205 may retrieve an item from the power metadata 500 that may be stored on the storage 235. The item retrieved, for example, may be the item corresponding to Server3 (e.g., row 3 of the power metadata 500).

At block 815, the power configuration data for other devices under the power budget may also be located. For example, referring to FIGS. 2 and 5, the console 205 may retrieve other items of data from the power metadata 500. For example, the console 205 may retrieve the items for all other devices with a group ID of "Rack 10".

At block 820, the console may identify the lowest priority servers that are not operating at their lowest power levels. For example, referring to FIG. 5, if Server5 is not operating at its lowest power level, this server may be identified. If other servers have priority 40 and are not operating at their lowest power levels, they may also be identified.

At block 825, a determination is made as to which of the devices identified at block 820 are utilizing the least of its power budget. For example, if two servers were determined at block 820 and one server was utilizing on average 50% of its budgeted power while another server was utilizing on average 75% of its budgeted power, the server utilizing 50% of its budgeted power would be determined to be utilizing the least of its power budget.

At block 830, the determined device is instructed to operate at a lower power level. In addition, the device is instructed to send notification if it exceeds its new budgeted power. For example, a device operating at 600 watts may be instructed to begin operating at 500 watts and to send notification if it exceeds 500 watts.

At block 835, more power budget is allocated to the device that sent the notification. For example, if a high priority device was originally allocated 700 watts, this device may then be allocated 800 watts. The device may also be instructed to send notification if it exceeds 800 watts.

At block 840, the actions return.

FIG. 9 is a block diagram that illustrates an exemplary user interface that may notify a system administrator of a reallocation of power budget in accordance with aspects of the subject matter described herein. The user interface 900 may identify the location 902 (e.g., Rack5) of the devices that have undergone power budget reallocation. In addition, the user interface 900 may include the device names 905 and 925 of the devices involved in the reallocation as well as their priorities 910 and 930, old power budgets 915 and 935, and new power budgets 920 and 940. Although the information illustrated in FIG. 9 is shown mostly in text format in a single window, it will be recognized that many other ways of displaying this information may be utilized without departing from the spirit or scope of the subject matter described herein. For example, tables, dialog boxes, charts, graphical depictions, and the like may be used to depict a power reallocation event without departing from the spirit or scope of the subject matter described herein. In addition, more, less, or different information may be displayed regarding the devices such as average power usage, max power usage, resource utilization, and so forth without departing from the spirit or scope of the subject matter described herein.

As can be seen from the foregoing detailed description, aspects have been described related to using priorities and power usage to allocate power budget. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer readable storage medium having computer-executable instructions stored thereon, which when executed perform actions, comprising:
   receiving a notification from a first device that the first device exceeded a threshold associated with a budgeted power, the first device being one of a plurality of devices associated with a power budget that indicates a maximum power that the devices together are allowed to consume;
   based at least on a priority and power usage, determining a second device to instruct to lower a power level at which the second device is operating; and
   instructing the second device to lower the power level at which the second device is operating.

2. The computer readable storage medium of claim 1, wherein the first device comprises a rack that houses the other devices and wherein the second device comprises a server housed in the rack.

3. The computer readable storage medium of claim 1, wherein the devices comprise blades included in a blade server, wherein the notification is received from a blade chassis controller of the blade server, and wherein instructing the second device to lower its power consumption comprises instructing the blade chassis controller to lower power consumption of a blade contained within the blade server.

4. The computer readable storage medium of claim 1, wherein determining a second device to instruct to lower a power level at which the second device is operating comprises determining a second device that is not operating at its lowest power level.

5. The computer readable storage medium of claim 1, determining a second device to instruct to lower a power level at which the second device is operating comprises determining one or more of the devices that have the lowest priority that are not operating at their lowest power level, and determining, using the power usage, one of the one or more devices that has used a smallest percentage of its budgeted power.

6. The computer readable storage medium of claim 1, wherein the power usage comprises a maximum power consumed, a minimum power consumed, and an average power consumed over a time period.

7. The computer readable storage medium of claim 1, further comprising instructing each of the devices to operate at a selected power level according to a priority associated with the device and to send a notification if the device exceeds the selected power level.

8. The computer readable storage medium of claim 1, wherein the power budget also indicates a temperature under which the devices are to operate and wherein receiving a notification that a first device exceeded its threshold indicates that at least one of the devices has exceeded the temperature.

9. The computer readable storage medium of claim 1, further comprising increasing the budgeted power of the first device and instructing the first device to provide a notification if it exceeds a threshold associated with the increased budgeted power.

10. The computer readable storage medium of claim 9, further comprising sending a notification to a system administrator regarding increasing the budgeted power of the first device and lowering the power level of the second device.

11. A method implemented at least in part by a computer, the method comprising:
    budgeting power to a plurality of devices using at least one processor based at least in part on priorities associated with the devices, each of the devices being associated with a priority with respect to power usage;
    instructing each device to send notification if power usage of the device exceeds a threshold associated with a budgeted power for the device;
    receiving a notification from a device that the device has exceeded the threshold for the device;
    if the device is operating at its lowest power level, instructing the device to power down; and
    if the device is operating at a power level greater than its lowest power level, instructing the device to operate at a lower power level than the device is currently operating at.

12. The method of claim 11, further comprising indicating power budgeted to each device in a data structure, the data structure including an indication of which devices of a data center are included in the plurality of devices.

13. The method of claim 12, wherein if the device is operating at a power level greater than its lowest power level further comprising maintaining unchanged the power budgeted to the device in the data structure.

14. The method of claim 11, further comprising maintaining data regarding power usage of each of the devices.

15. The method of claim 11, further comprising maintaining an indicator of a power profile at which a device is currently operating for each of the devices.

16. The method of claim 15, wherein the indicator is associated with a power level that is not to be exceeded at the power profile.

17. The method of claim 11, wherein instructing the device to operate at a lower power level than the device is currently operating at comprises instructing the device to operate at a lower power level via an operating system executing on the device.

18. In a computer system, a method for displaying power information, the method comprising:
   receiving an indication from a first device that the first device has exceeded a power budgeted to the first device, the first device being one of a plurality of devices associated with a power budget that indicates a maximum power allotted to the devices;
   in response to the indication, based at least in part on a priority and power usage of a second device, determining a second device to remove power budget from to give to the first device using at least one processor;
   displaying an identifier associated with the first device; and
   displaying an identifier associated with the second device.

19. The method of claim 18, further comprising displaying a priority of the first device and a priority of the second device.

20. The method of claim 18, further comprising displaying old and new power budgets of the first and second devices.

* * * * *